2,765,354

POLYMERIC CARBON AND METHOD OF PRODUCTION

Gilbert B. Carpenter, Mountain Lakes, Edward R. Blanchard, Summit, and Alio J. Buselli, New Providence, N. J., assignors to Air Reduction Company, Incorporated, New York, N. Y., a corporation of New York No Drawing. Application March 23, 1953,
Serial No. 344,215

9 Claims. (Cl. 260—666)

This invention relates to new chemical products and methods, and has for its object the provision of polymeric carbon and a method of producing the carbon. More particularly, the invention provides polymeric carbon formed by dehydrogenation of polyacetylene, a polymer known as cuprene or carbene. The polymeric carbon is characterized by chemical stability and inertness and by greater density and electrical conductivity than the polymer.

This invention is based upon the discovery that volatile degradation products can be removed from polyacetylene at temperatures above 320° C. when the polyacetylene is protected by the use of a vacuum or an inert gas, such as nitrogen or argon. When polyacetylene is heated while suitably protected, it appears to be relatively stable up to 320° C. As the temperature is increased, the polymer undergoes a progressive degradation manifested by a loss of volatile matter and an increase in density. The degree of this degradation is almost linearly proportional to temperature up to about 540° C. The increase in density when heated above about 540° C. is very slight although the other properties change appreciably as the product progressively changes to a structure having some of the characteristics of diamond.

The method of the invention may be applied to the loose polymer as initially produced or to various shaped articles molded from the polymer. The molded articles may be produced advantageously according to the method of copending application of Gilbert B. Carpenter, Otis W. Fortner and Alio J. Buselli, Serial No. 344,216, filed March 23, 1953.

Table I which follows shows the effects of heating molded and non-molded polyacetylene at different temperatures, periods, and in the presence of different gases at atmospheric pressure:

TABLE I

*Effect of temperature on polyacetylene*

| Run No. | Polymer Form | Atmosphere | Max. t., ° C. | Time at t., ° C. | Wt. Loss, Percent | Remarks |
|---|---|---|---|---|---|---|
| 1 | Molded disc | Air | 300 | 19 hrs | 96.0 | Black ash. |
| 2 | do | Air | 200 | 18 hrs | +4.3 | Retained shape and color. |
| 3 | do | $N_2$ | 450 | 10 min | 14.4 | No apparent change. |
| 4 | do | $N_2$ | 450 | 4 hrs | 33.3 | Turned black; retained shape. |
| 5 | do | Air | 250 | 17 hrs | 81.3 | Partially ashed; lost shape. |
| 6 | do | $N_2$ | 450 | 1 hr | 4.5 | Retained shape; edges split. |
| 7 | do | $N_2$ | 450 | 4 hrs | 12.7 | Blackened and cracked. |
| 8 | do | $N_2$ | 450 | 4 hrs | 24.0 | Blackened but retained shape. |
| 9 | Powdered disc | $N_2$ | 450 | 4 hrs | 40.0 | Black; some ashing. |
| 10 | Unmolded | $N_2$ | 700 | 2.5 hrs | 17.8 | Darkened. |
| 11 | Molded disc | $N_2$ | 700 | 2.5 hrs | 24.9 | Noticeable shrinkage of disc. |
| 12 | do | $N_2$ | 340 | 1 hr | 1.5 | No change. |
| 13 | do | $N_2$ | 360 | 1 hr | 3.1 | Do. |
| 14 | do | $N_2$ | 380 | 1 hr | 2.0 | Do. |
| 15 | do | $N_2$ | 400 | 1 hr | 3.6 | Do. |
| 16 | do | $N_2$ | 450 | 1.5 hrs | 11.8 | Darkened; loss in diameter. |
| 17 | do | $N_2$ | 525 | 1.5 hrs | 22.0 | Do. |
| 18 | do | $N_2$ | 500 | 1 hr | 18.7 | Do. |
| 19 | do | $N_2$ | 580 | 1 hr | 13.9 | Disc was dark and cracked. |
| 20 | do | $N_2$ | 550 | 2 hrs | 23.2 | Disc showed loss in diameter and darkened. |
| 21 | do | $N_2$ | 700 | 2.5 hrs | 24.9 | Good disc reduced in size. |
| 22 | do | $N_2$ | 890 | 15 min | 25.8 | Do. |
| 23 | do | $N_2$ | 900 | 3 hrs | 24.8 | Good disc 1⅜" in diameter. |
| 24 | do | $N_2$ | 325 | 35 min | 3.05 | Small loss in diameter. |
| 25 | Unmolded | $N_2$ | 325 | 15 min | 3.05 | No change. |
| 26 | do | $N_2$ | 400 | 1 hr | 7.17 | Do. |
| 27 | do | $N_2$ | 550 | 1 hr | 25.6 | Darkened. |
| 28 | do | $N_2$ | 700 | 1 hr | 25.8 | Do. |

In Runs 3, 4, 6, 7, 8 and 9, the nitrogen was 99.8% $N_2$ plus argon and a small amount of $O_2$.

In Runs 10 to 28 purified nitrogen was used which contained about 99.9% $N_2$ and substantially no $O_2$.

In Run No. 11 a Dry Ice trap was attached to the exit stream in order to trap out the higher boiling volatiles. Material corresponding to a weight loss of 17.5% was collected in the trap. On warming the condensate to room temperature, the material appeared to be a non-volatile oily liquid which did not decolorize bromine in carbon tetrachloride. Assuming that the loss of weight noted in the final analysis was due mainly to the cracking of C–H bonds, then the maximum amount of low boiling material, such as methane, ethane, ethylene and acetylene, amounts to about 85% of the total weight lost. The density as measured by Archimedes' Principle on the products of Run Nos. 27 and 28 was observed to change from approximately 0.92 before heating to 1.46 after heating which is equivalent to a density of about 1.5.

Table II shows that the loss of weight corresponds roughly to the loss in volume during the heating process.

TABLE II

| Run No. | Weight Loss, Percent | Decrease in Cross-Sectional Area, Percent |
| --- | --- | --- |
| 1 | 28.1 | 25.0 |
| 2 | 1.5 | 0.0 |
| 3 | 3.1 | 2.4 |
| 4 | 13.9 | 18.0 |
| 5 | 24.8 | 30.0 |
| 6 | 23.2 | 26.0 |

Analysis of the final product shows that about 80–90% of the hydrogen in the polymer is lost during the heating process. Two samples heated to 700° C. had the following analysis:

| Sample No. | Form | Percent C Final | Percent H Final | C/H Final | C/H Average Initial |
| --- | --- | --- | --- | --- | --- |
| 1 | Unmolded | 89.8 | 0.78 | 9.6 | 1.25 |
| 2 | Molded disc | 95.8 | 1.20 | 8.1 | 1.25 |

Polyacetylene has high dielectric properties and cannot be considered as an electrical conductor. The polymeric carbon of the invention resulting from the degradation of the polymer is an electrical conductor the resistivity of which can be controlled by the degree of degradation, and because of its high resistivity is an effective resistor for many purposes.

The dielectric constant of polyacetylene is comparable to the methacrylates and hard rubber, better than the phenolics, but not as good as polystyrene or polyethylene. By effecting dehydrogenation progressively in increments a series of electrical resistors and electronic semi-conductors of graduated resistivity can be produced.

For example, the polymer has a volume resistivity $10^{14}$ ohm-cm. When the polymer is heated, weight losses of 18%, 23%, and 25% result in resistivity values of $10^9$, $10^7$, and $10^3$ ohm-cm., respectively. The last value approximately equals the conductivity of graphite.

We claim:

1. Shaped articles formed of polymeric carbon produced essentially by heating molded articles of cuprene in an inert atmosphere to a temperature above 320° C.

2. The method of forming polymeric carbon which consists essentially of heating cuprene in an inert atmosphere at a temperature above 320° C. to effect dehydrogenation.

3. In the method of claim 2 heating a molded cuprene article.

4. In the method of claim 2 heating the cuprene in an atmosphere of nitrogen.

5. In the method of claim 2 heating the cuprene in an atmosphere of argon.

6. Polymeric carbon prepared essentially by heating cuprene in an inert atmosphere to a temperature of from about 320° C. to about 900° C., said polymeric carbon having a ratio of carbon atoms to hydrogen atoms of about 8:1 to about 10:1 and about 0.787 to 1.20% hydrogen, and having an electrical volume resistivity of from about $10^{13}$ ohm-cm. to about $10^4$ ohm-cm.

7. The method of forming polymeric carbon having an electrical volume resistivity of from $10^{13}$ ohm-cm. to about $10^4$ ohm-cm. which consists essentially of heating cuprene in an inert atmosphere at a temperature of from about 320° C. to about 900° C. to effect dehydrogenation, and selecting the particular temperature employed so that a polymeric carbon is obtained having a desired electrical volume resistivity within the aforesaid range.

8. A shaped article of polymeric carbon having an electrical volume resistivity of from $10^{13}$ ohm-cm. to about $10^4$ ohm-cm. prepared essentially by heating a molded article of cuprene in an inert atmosphere at a temperature of from about 320° C. to about 900° C., and where the heating temperature was selected so that the desired electrical volume resistivity is within the aforesaid range.

9. The method of forming polymeric carbon having an electrical volume resistivity of from $10^{13}$ ohm-cm. to about $10^4$ ohm-cm. which consists essentially of heating cuprene in an inert atmosphere at a temperature of from above about 320° C. up to about 540° C. to effect dehydrogenation, and selecting the particular temperature employed so that a polymeric carbon is obtained having a desired electrical volume resistivity within the aforesaid range.

References Cited in the file of this patent

UNITED STATES PATENTS

| 2,453,440 | Kaufmann | Nov. 9, 1948 |
| 2,582,764 | Bailey | Jan. 15, 1952 |
| 2,697,028 | Baker et al. | Dec. 14, 1954 |

FOREIGN PATENTS

| 20,851 | Holland | Nov. 15, 1929 |

OTHER REFERENCES

Ellis: The Chemistry of Synthetic Resins, vol. 1, pages 142–147 (1935), Reinhold Publishing Corp., New York.

Calhoun: Canadian Journal of Research, vol. 15B (1937), pp. 208–23.